United States Patent [19]
Anderson et al.

[11] Patent Number: 5,539,733
[45] Date of Patent: Jul. 23, 1996

[54] METHOD FOR SWITCHING DATA FLOW IN A FIBER DISTRIBUTED INTERFACE (FDDI) SYSTEM

[75] Inventors: Paul M. Anderson, Dripping Springs; Lloyd A. Hasley, Austin, both of Tex.

[73] Assignee: Motorola, Inc., Schaumburg, Ill.

[21] Appl. No.: 445,893

[22] Filed: May 22, 1995

Related U.S. Application Data

[62] Division of Ser. No. 151,676, Nov. 15, 1993, Pat. No. 5,442,628.

[51] Int. Cl.⁶ .................................................. H04L 12/52
[52] U.S. Cl. ............................................ 370/58.2; 370/67
[58] Field of Search ............................... 370/53, 54, 58.1, 370/58.2, 58.3, 6, 85.5, 108, 85.4; 340/825.83, 826, 825.79, 825.85, 825.86; 359/135, 139, 117, 137, 152

[56] References Cited

U.S. PATENT DOCUMENTS

| | | | |
|---|---|---|---|
| 4,530,088 | 7/1985 | Hamstra et al. | 370/110 |
| 4,710,769 | 12/1987 | Friedman et al. | 340/825.03 |
| 4,771,419 | 9/1988 | Graves et al. | 370/58.3 |
| 5,084,870 | 1/1992 | Hutchison et al. | 370/94.1 |
| 5,128,927 | 7/1992 | Killat et al. | 370/56 |
| 5,157,531 | 10/1992 | Foglia | 359/152 |
| 5,161,191 | 11/1992 | Gupta et al. | 380/37 |
| 5,237,564 | 8/1993 | Lespagnol et al. | 370/60.1 |
| 5,247,626 | 9/1993 | Firoozmand | 395/250 |
| 5,265,088 | 11/1993 | Takigawa et al. | 370/15 |
| 5,301,303 | 4/1994 | Abraham et al. | 395/500 |
| 5,303,231 | 4/1994 | Shinomiya et al. | 370/58.2 |
| 5,444,700 | 8/1995 | Martikainen et al. | 370/582 |

Primary Examiner—Benedict V. Safourek
Attorney, Agent, or Firm—Keith E. Witek

[57] ABSTRACT

An integrated circuit for use in fiber distributed data interface (FDDI) system has four elastic layer and buffer management (ELM) circuits (12, 14, 16, and 18) coupled through a crossbar switch (20). The crossbar switch (20) allows any of the ELM circuits (12, 14, 16, and 18) to be coupled to any other ELM circuit (12, 14, 16, or 18) or to one of three external buses for FDDI communication. By using a crossbar switch and four ELM devices on a single integrated circuit, FDDI performance is improved while system design is made easier and more flexible than previously possible. Cipher circuitry (22, 24, 26, and 28) is used to scramble and descramble data ingoing and outcoming from the ELM devices. Concentrators, workstations, local area networks (LANs), and the like may incorporate the circuit (10) to improve performance and flexibility.

20 Claims, 6 Drawing Sheets

METHOD FOR SWITCHING DATA FLOW IN A FIBER DISTRIBUTED INTERFACE (FDDI) SYSTEM

This is a divisional of application Ser. No. 08/151,676 filed Nov. 15, 1993, now U.S. Pat. No. 5,442,628.

FIELD OF THE INVENTION

The present invention relates generally to semiconductor circuits, and more particularly, to fiber data distributed interface (FDDI) circuits.

BACKGROUND OF THE INVENTION

Currently, fiber distributed data interface (FDDI) concentrator systems are designed and built with discrete elastic buffer and layer management (ELM) circuits, inadequate discreet multiplexed interconnection circuitry, and other discrete components. This type of design causes a number of problems. Not only are discrete ELM parts used, but the switching matrix, the logic to control the switching matrix, and all of the buses that couple these systems are implemented discretely. The board size of current FDDI concentrators is very large due to the use of discrete parts. The large board size and number of components make the concentrator systems unduly costly. Furthermore, the inadequate discreet multiplexed interconnection circuitry does not allow for exhaustive, flexible, FDDI specification compatible interconnections in all possible FDDI scenarios.

Specifically, the switching matrixes in current concentrators are made up of multiplexers. These multiplexers are expensive to implement discretely, and their flexibility is limited. In order to meet all of the requirements of Station Management (SMT) software, a very large number of multiplexers would be necessary. Discrete systems normally compromise and have a limited number of multiplexers that give a limited amount of interconnection flexibility. These systems are not fully compliant with the mandates of SMT.

The muxing structures that normally make up the switching matrix are very difficult to control. The control circuitry that is also implemented discretely is therefore complex, and the software that controls them is also difficult. Having to deal with these types of problems increases the design time for a concentrator. Not only is the hardware design more time consuming, but complex control software also increases design cycle time.

SUMMARY OF THE INVENTION

The previously mentioned disadvantages are overcome and other advantages achieved with the present invention. In one form, the present invention comprises an integrated circuit for allowing token-passing local area network communication. The integrated circuit having a first circuit, a second circuit, and circuitry for switching. The first circuit has a first input, a second input, a first output, and a second output. The first input is used for receiving a first plurality of bits from external to the integrated circuit. The first circuit groups the first plurality of bits into data flames and provides the data flames to the first output of the first circuit. The second output provides data external to the integrated circuit. The second circuit has a first input, a second input, a first output, and a second output. The first input is used for receiving a second plurality of bits from external to the integrated circuit. The second circuit groups the second plurality of bits into data frames and provides the data flames to the first output of the second circuit. The second output is used for providing data external to the integrated circuit. The circuitry for switching has a first input coupled to the first output of the first circuit, a second input coupled to the first output of the second circuit, a third input for receiving data external to the integrated circuit, a first output coupled to the second input of the first circuit, a second output coupled to the second input of the second circuit, and a third output for providing data external to the integrated circuit.

In another form, the invention comprises an integrated circuit for use in a local area network (LAN) having N circuits and a crossbar switching circuit. Each of the N circuits, wherein N is a finite integer greater than one, has a unique input from external to the integrated circuit and a unique output external to the integrated circuit. Each of the N circuits is a circuit used for encoding/decoding bits being passed through the integrated circuit, grouping received binary bits into or out from data frame structures, adjusting for clock tolerances between incoming and outgoing data between the unique input and the unique output, and detecting errors in encoded data within the integrated circuit. The crossbar switching circuit has: (1) at least N+1 inputs wherein N of the N+1 inputs are each coupled to a unique one of the N circuits; (2) at least N+1 outputs wherein N of the N+1 outputs are each coupled to a unique one of the N circuits; (3) at least one input coupled to a first external integrated circuit terminal; and (4) at least one output coupled to a second external integrated circuit terminal, the crossbar switch allowing any of the N+1 inputs to be coupled to any of the N+1 outputs via programmable address bits.

In yet another form, the invention comprises a method for controlling the interconnection of a plurality of input conductors to a plurality of output conductors in a local area network. The method involves writing an address value to each control register in a plurality of control registers wherein each control register in the plurality of control registers corresponds to at least one output conductor, wherein each address value written to each control register identifying an input conductor. A switching circuit is switched to connect any one of the input conductors to any one of the output conductor based upon the address values stored in the plurality of control registers.

In yet another form, the invention comprises a local area network system having N distinct circuits where N is a finite integer greater than one and a crossbar switching circuit.

In yet another form, the invention comprises a concentrator system for use in a local area network. The concentrator has a processor for managing the operation of the concentration system. The processor having an address bus, a data bus, and at least one control signal. The concentrator has an integrated circuit coupled to the each of the address bus, the data bus, and the at least one control signal. The integrated circuit has M circuits within the integrated circuit, wherein M is a positive finite integer greater than one, each of the M circuits receiving a plurality of data bits within the concentrator system and grouping the plurality of data bits into data flames. The M circuits are selectively interconnected via a switching circuit to transfer the data frames within the local area network. The concentrator has a first circuit for extracting data bits from a first data stream provided from external to the concentrator system. The first circuit has a first terminal coupled to send data to the integrated circuit and a second terminal for transmitting data from the integrated circuit. The concentrator has a second circuit for extracting data bits from a second data stream provided from external to the concentrator system. The second circuit has a first terminal coupled to send data to the integrated circuit and a second terminal for transmitting data from the integrated circuit.

In yet another form, the invention comprises a single integrated circuit having both an elastic buffer and layer management circuit and a cipher circuit for scrambling and unscrambling bits within the integrated circuit.

The present invention will be more clearly understood from the detailed description below in conjunction with the accompanying drawings.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Generally, the present invention provides a method and an apparatus for crossbar switching a unique quad elastic buffer and layer management (ELM) integrated circuit, a quad elastic buffer and layer management (ELM) integrated circuit design, a local area network (LAN) which uses the quad ELM integrated circuit, a fiber distributed data interface (FDDI) using the quad ELM integrated circuit, a concentrator device using one or more quad ELM integrated circuits, and other efficient uses of a quad ELM device. The quad ELM device and the switching method are accomplished by integrating four ELM devices on a single integrated circuit with three buses and a crossbar switch, which allows the user to arrange the four ELMs and the three buses into many different configurations. Any design using the quad ELM integrated circuit can achieve full compliance with the requirements of Station Management (SMT) software.

The primary application of the quad ELM device is in FDDI concentrators, and the flexibility provided by the crossbar switch on the quad ELM device enables a concentrator system using the quad ELM to comply with the requirements of FDDI Station Management (SMT) software as stated previously. This has proven to be a difficult if not impossible task for current FDDI concentrators that are implemented with discrete components and not the quad ELM device illustrated in FIG. 1. Having the crossbar switch on the quad ELM chip eliminates the need for an external multiplexing scheme and associated control circuitry in a concentrator design. This, along with the fact that the four ELM devices are combined on a single integrated circuit, greatly reduces board area in concentrator designs, improves flexibility, and reduces cost.

In addition to these features, the quad ELM device also provides four cipher devices (also referred to as scrambling/descrambling devices/circuits) that are coupled to the ELM devices (i.e., one cipher coupled to one ELM). These cipher devices can be used to scramble the bit streams produced by the ELM devices which allows the bit streams to be sent over Unshielded Twisted Pair (UTP) connections rather than fiber optic cable connections, which is the original media used with FDDI. The cipher devices also provide for the descrambling of incoming bit streams to the ELM devices. Another feature of the cipher devices is a set of timers that allow fine granularity of control of the transitioning between certain FDDI connection states.

Figure 1:
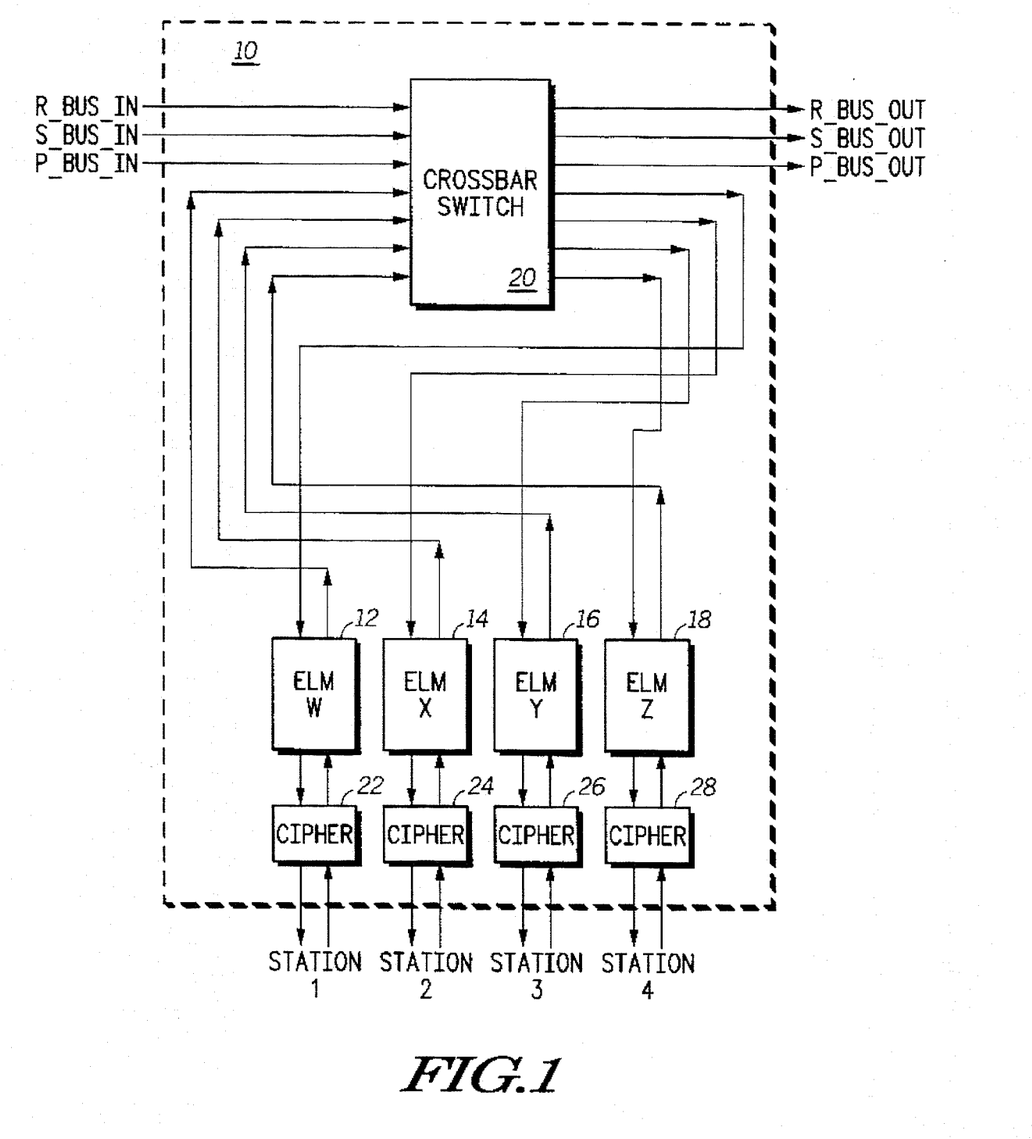
FIG. 1 illustrates, in a block diagram, an integrated circuit having four elastic layer and buffer management (ELM) circuits and a crossbar switching circuit in accordance with the present invention.

The present invention overcomes many of the disadvantages described above and can be more fully understood with reference to FIGS. 1–7. FIG. 1 illustrates a quad ELM device having four elasticity buffer and layer management circuits (ELM circuits) 12, 14, 16, and 18. The four ELM circuits 12, 14, 16, and 18 of FIG. 1 are selectively coupled through a crossbar switch circuit 20. Each of the ELM circuits 12, 14, 16 and 18 implements the physical layer functions of the FDDI standard including data framing, elasticity buffering, encoding, decoding, smoothing, line state detection and repeat filtering.

In general, an ELM device is intended to perform the function of the Physical Layer (PHY) of the FDDI protocol. The FDDI protocol specifies the use of distributed clocking on the local area network (LAN). Each station of the LAN has a locally-generated clock for transmitting information on the FDDI communication ring which couples all the stations in the LAN together. A receiving station synchronizes its clock to an incoming data stream. The station decodes the data using this clock and transmits data using the local clock as a clock source.

The ELM device also encodes and decodes information within the LAN. The basic unit of information in the FDDI system is a "symbol". Symbols (data symbols—used to transmit data; line state symbols—used to verify and maintain the FDDI communication ring integrity; control indicator symbols—used to indicate the status of a data frame) are transmitted from station to station on the communication ring. Data frames, or a plurality of grouped symbols or a data stream of symbols, are communicated in the FDDI system via the ELM devices. FDDI encoding and decoding processes are well known in the art.

Each ELM in an FDDI system uses an elasticity buffer. Each station uses a locally generated clock to transmit symbols, and the clocks are never operating at exactly the same frequency. This may, if not corrected, cause bits to be lost during communication. The elasticity buffer is used to ensure that no bits are lost due to mismatched clock frequencies.

Each ELM performs smoothing operations. The start of each FDDI frame contains idle symbols from an idle bus.

Synchronization is achieved via these idle symbols. As a frame circles the communication ring, some of the symbol frame preamble symbols may be lost and the frame itself may then be lost. To prevent this from happening, a smoother is implemented by the ELM devices wherein the smoother inserts or deletes symbols in the preamble before repeating the frame on the communication ring. This insertion and/or deletion is performed to ensure that enough preamble is present for the downstream neighbor in the ring to properly receive the frame.

An ELM repeat filter is used to prevent the propagation of code violations or invalid line states through the ring. A repeat filter permits propagation of valid frames, propagation of lost or damaged frames so that they can be counted by the next media access control (MAC) entity on the ring, and allows a station to repeat data from its upstream neighbor to its downstream neighbor, etc..

In FIG. 1, the crossbar switch circuit 20 controls how each of the four ELM circuits 12, 14, 16, and 18 is coupled with the three input data buses (P_BUS_IN, S_BUS_IN, and R_BUS_IN), the three output data buses (P_BUS_OUT, S_BUS_OUT, and R_BUS_OUT), and the other ELM circuits 12, 14, 16, and/or 18. A preferred crossbar switch allows any of its inputs to be coupled with any of its outputs. Each of the inputs and outputs of the crossbar switch circuit 20 is 11 bits in width. These 11-bit buses contain 10 bits of data (two parallel 5-bit encoded data values are communicated in an FDDI bus protocol) and a single parity bit. The three input data buses (P_BUS_IN, S_BUS_IN, and R_BUS_IN) and three output data buses (P_BUS_OUT, S_BUS_OUT, and R_BUS_OUT) can be used to transfer data frames to or from another ELM, quad ELM, or media access control (MAC) device.

The cipher circuits 22, 24, 26, and 28 illustrated in FIG. 1 are optionally used by the quad ELM to scramble data going out onto the media and descramble input data coming from the media.

Stations 1, 2, 3, and 4 illustrated in FIG. 1 represent other FDDI end-stations (e.g., a workstation) or concentrators coupled to the circuit 10 via fiber optic or twisted pair media. The elements of FIG. 1 are discussed in more detail below.

Figure 2:
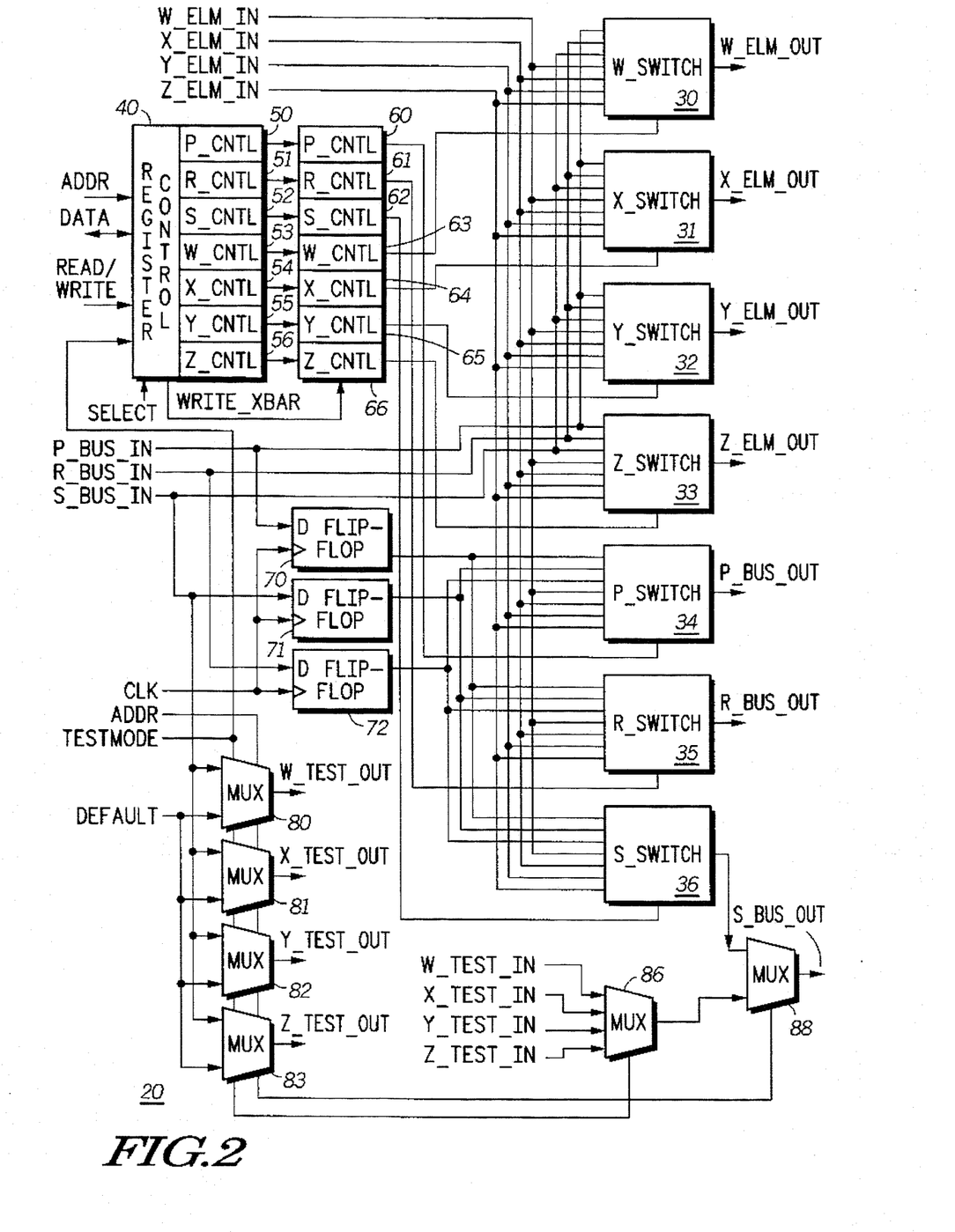
FIG. 2 illustrates, in a block diagram, a crossbar switching circuit in accordance with the present invention.

FIG. 2 illustrates a crossbar switch 20 which may be used as the crossbar switch 20 of FIG. 1. FIG. 2 illustrates the input buses which are analogous to the buses coupled between the inputs to the crossbar switch 20 and the outputs of the four ELM circuits 12, 14, 16, and 18 in FIG. 1; the bus that is the output from ELM W 12 (W_ELM_IN), the bus that is the output from ELM X 13 (X_ELM_IN), the bus that is the output from ELM Y 14 (Y_ELM_IN), and the bus that is the output from ELM Z 15 (Z_ELM_IN). The input buses P_BUS_IN, R_BUS_IN, and S_BUS_IN in FIG. 2 are analogous to the input buses labeled in FIG. 1.

FIG. 2 also illustrates the output buses of the crossbar switch 20 which are analogous to the buses coupling the crossbar switch 20 to the ELM circuits 12, 14, 16, and 18 in FIG. 1; the bus that is the input to ELM W 12 (W_ELM_OUT), the bus that is the input to ELM X 14 (X_ELM_OUT), the bus that is the input to ELM Y 16 (Y_ELM_OUT), and the bus that is the input to ELM Z 18 (Z_ELM_OUT). The output buses P_BUS_OUT, R_BUS_OUT, and S_BUS_OUT in FIG. 2 are analogous to the output buses labeled in FIG. 1.

The crossbar switch 20 selectively couples the input buses W_ELM_IN, X_ELM_IN, Y_ELM_IN, Z_ELM_IN, P_BUS_IN, R_BUS_IN, and S_BUS_IN to the output buses W_ELM_OUT, X_ELM_OUT, Y_ELM_OUT, Z_ELM_OUT, P_BUS_OUT, R_BUS_OUT, and S_BUS_OUT. The selective coupling is achieved with the switches, W_SWITCH 30, X_SWITCH 31, Y_SWITCH 32, Z_SWITCH 33, P_SWITCH 34, R_SWITCH 35, and S_SWITCH 36. Each of the individual switches 30, 31, 32, 33, 34, 35, and 36, couples one of its input buses to its output bus. The control registers 60, 61, 62, 63, 64, 65, and 66 provide control bits (i.e., address bits, one unique address for each input) to the switches 30, 31, 32, 33, 34, 35, and 36, which determine which input is coupled to the output of each switch in FIG. 2.

The register control circuitry 40 has an input address bus (ADDR), a bi-directional data bus (DATA), an input control signal (READ/WRITE), an input control signal (SELECT), an input control signal (TESTMODE) and an output control signal (WRITE_XBAR). The registers are in two stages. The first stage, registers 50, 51, 52, 53, 54, 55, and 56, are written with values taken from the DATA bus. The second stage, registers 60, 61, 62, 63, 64, 65, and 66, contain the actual control signals to the switches 30, 31, 32, 33, 34, 35, and 36. When the register control circuitry 40 asserts the WRITE_XBAR signal, the data in the first stage of registers is transferred to the second stage of registers. This allows all of the switches to change configuration simultaneously in time (i.e., in a parallel manner). If the TESTMODE signal is asserted, the current register values are overridden, and the registers in the crossbar switch 20 are configured to isolate a single ELM device for test purposes.

The register control circuit 40 uses the ADDR bus to determine which register in the first stage is to be acted upon. There is also a location that ADDR can select that, if written with any value will cause the WRITE_XBAR signal to be asserted. The READ/WRITE signal determines if a read or a write is to be performed on the register, and the SELECT signal causes the event (either read or write) to occur. If a read function is selected, the data that is contained by the register determined by ADDR will be placed on the DATA bus. If a write function is selected, the data that is present on the DATA bus will be placed in the register selected by ADDR.

FIG. 2 also illustrates three banks of D Flip-Flops 70, 71, and 72. The D Flip-Flops 70, 71, and 72, have an input clock (CLK) and also input buses P_BUS_IN, R_BUS_IN, and S_BUS_IN, respectively. The D Flip-Flops 70, 71, and 72, capture the data present on these buses on the rising edge of the CLK signal. The outputs of the D Flip-Flops 70, 71, and 72 are coupled with the inputs to P_SWITCH 34, R_SWITCH 35, and S_SWITCH 36. The D Flip-Flops 70, 71, and 72 are used to synchronize the data on the P_BUS_IN, R_BUS_IN, and S_BUS_IN buses to the CLK. If one of the these three buses is selected to be the output of switch 34, 35, or 36, the output of the switch will be a re-synchronized version of the input bus. This is done so that if one of the input buses to the quad ELM circuit 10 passes straight through the circuit 10 without coupling to the input of any ELM device 12, 14, 16, or 18, the bus will be synchronized. This synchronization makes it easier to cascade multiple quad ELM circuits 10 without suffering from the timing delay of passing straight through other quad ELM circuits 10.

As mentioned above, when the control signal TESTMODE is asserted, the crossbar circuit 20 isolates one of the four ELM circuits 12, 14, 16, or 18, for testing purposes. Which ELM circuit is isolated is determined by the ADDR bus. When a particular ELM circuit is isolated for test, additional input signals to the ELM circuit are made available by the MUXes 80, 81, 82, and 83. These additional input signals to the ELM circuits are grouped into buses (W_TEST_OUT, X_TEST_OUT, Y_TEST_OUT, and Z_TEST_OUT). The additional inputs are accessed via certain bits on S_BUS_IN that are coupled to the inputs of MUXes 80, 81, 82, and 83. TESTMODE and ADDR control the four MUXes 80, 81, 82, and 83. If a particular ELM circuit is not isolated for testing purposes, an input bus (DEFAULT) is coupled to these additional input signals by the MUXes 80, 81, 82, and 83.

When one of the ELM devices 12, 14, 16, or 18 is isolated for test, there are additional outputs from the ELM that need to be accessed external to the quad ELM device 10. These additional output signals are coupled to specific pins on the S_BUS_OUT bus with the multiplexers MUX 86 and MUX 88. MUX 86 is controlled by the ADDR bus, selecting which ELM output signals are to be coupled to the input of MUX 88. MUX 88 is controlled by the TESTMODE signal. If TESTMODE is asserted, the additional ELM output signals are coupled to the S_BUS_OUT bus. If TESTMODE is not asserted, MUX 88 will couple the output of S_SWITCH 36 to the output bus S_BUS_OUT.

Figure 3:
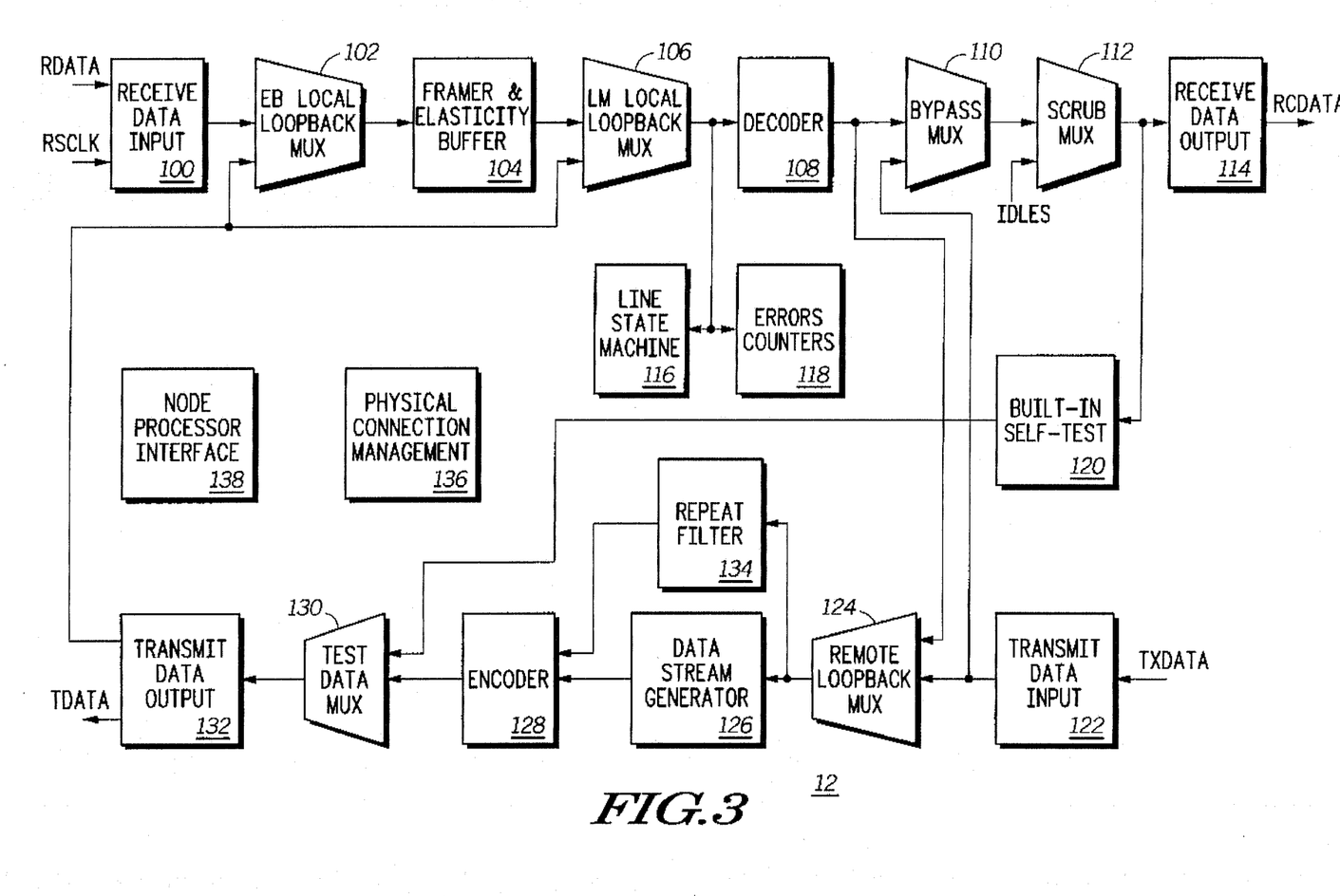
FIG. 3 illustrates, in a block diagram, an elastic layer and buffer management (ELM) circuit in accordance with the present invention.

FIG. 3 illustrates an elastic buffer and layer (ELM) management circuit which may be used in FIG. 1 for ELM circuits 12, 14, 16, and 18. FIG. 3 illustrates one ELM circuit 12. The following paragraphs describe the functionality of the individual ELM circuit.

A Receive Data Input 100 synchronizes the input data stream (RDATA) into the ELM circuit using the input clock (RSCLK). RDATA and RSCLK are analogous to the input to the ELM circuits from the cipher circuits in FIG. 1.

An EB Local Loopback Mux 102 selects either the data stream from the Receive Data Input 100 or a transmit data stream.

A Framer and Elasticity Buffer 104 is used to align the incoming data to form proper symbol alignment. A starting delimiter used at the beginning of each frame is detected by the Framer and Elasticity Buffer 104 and is used to determine proper symbol boundaries for the data. The Framer and Elasticity Buffer 104 is designed so that the starting delimiter, the JK-symbol pair, is detected independently of previous framing. The Framer and Elasticity Buffer 104 performs the necessary buffering to allow data to pass between different FDDI stations with independent station clocks. The Framer and Elasticity Buffer 104 consists of an 80-bit buffer and some control circuitry. The Framer and Elasticity Buffer 104 is used to compensate for the differences in the transmit and receive clock frequencies in the station. Data is clocked into Framer and Elasticity Buffer 104 by the RSCLK input and clocked out of the buffer by a local byte clock. Note: Framer and Elasticity Buffer 104 use a different version of the local byte clock than the rest of the ELM chip. This version is generated in the ELM circuit from a local symbol clock (SYMCLK).

A Link Management Local Loopback MUX 106 (LM Local Loopback Mux 106) normally selects data from the Framer and Elasticity Buffer 104 and passes it through to a Decoder 108. LM local Loopback Mux 106 can select the transmit data stream to permit an additional form of loopback testing to allow fault isolation.

The Decoder 108 performs the required 4B/5B (4-bit to 5-bit) decoding of received data symbols. The five bits of aligned data from the LM Local Loopback Mux 106 are decoded into four bits of data and one control bit, with the high-order bit being the control bit. The decoded data is sent to a Bypass Mux 110. Although the decoder operates on symbol pairs, each symbol is decoded independently of the other. The decoding and encoding scheme is known in the art.

The Bypass Mux 110 normally selects the decoded data stream from the Decoder 108 and passes it through to a Scrub Mux 112. The Bypass Mux 110 can also select the data stream from a Transmit Data Input 112. The Bypass Mux 110 is typically used in current concentrators not employing a quad ELM circuit 10 to disconnect a station from the ring and still provide ring continuity.

The Scrub Mux 112 normally selects the data stream from the Bypass Mux 110 and passes it through to a Receive Data Output 114. The Scrub Mux 112 can also force Idle symbols into the data stream from an idle bus. The Scrub Mux 112 is typically used during physical connection insertion and removal to force Idle symbols when "scrubbing" the ring.

The Receive Data Output 114 outputs the data from the Scrub Mux 112 external to the ELM circuit on the output data bus CRCDATA). RCDATA is analogous to the output bus from the ELM that coupled the ELM to the crossbar switch 20 (see FIG. 1). The Receive Data Output 114 outputs an odd parity bit along with the data to permit fault isolation between the various ELM circuits.

A Line State Machine 116 monitors the receive data stream output from the LM Local Loopback Mux 106 to detect line states. A line state is a special group of symbols, quiet (Q), halt (H), idle (I), and the JK start delimiter. These line states are to establish a physical connection between neighboring stations. These line states are unique in that they can be recognized independent of symbol boundaries.

An Error Counters 118 provides an indication of the inbound link quality to a Physical Connection Management circuit 136. In order to establish a new connection, the Physical Connection Management circuit 136 uses this indication to determine if the Link Confidence Test passes. Once a link is active, the PCM continually monitors the Error Counters 118 to detect links that have an inadequate bit error rate.

The Transmit Data Input 122 synchronizes the input transmit data stream (TXDATA) to the rising edge of the local byte clock (BYTCLK). The TXDATA data stream is first strobed by the negative edge of the local symbol clock (SYMCLK). TXDATA is analogous to the input bus to the ELM from the crossbar 20 (see FIG. 1). Parity is checked on the data stream and the data stream is forced to be violation symbols if the parity is in error.

A Remote Loopback Mux 124 normally selects the data stream from the Transmit Data Input 122 and passes the data stream to both a Repeat Filter 134 and a Data Stream Generator 124.

The Data Stream Generator 124 uses a multiplexer to generate a specified pair of symbols under control of the Physical Connection Management circuit 136, the Repeat Filter 134, or by an external processor.

The Repeat Filter 134 allows only Idle and Active Line states to pass through the ELM circuit. Invalid line states are turned into a Idle symbol stream. Also, if the Repeat Filter 134 detects a corrupted frame, it truncates the frame by transmitting four H symbols and then a I symbol. The Repeat Filter 134 also detects frame fragments and changes the last two symbols in each fragment to I symbols. A fragment is a frame in which an I-symbol occurs in the data stream prior to the ending delimiter. For various FDDI terminology used herein, please see U.S. Pat. No. 4,530,088, by Hamstra et al., assigned to Sperry Corp., issued Jul. 16, 1985, which has since issuance become an ANSI FDDI standard (in particular, see FIGS. 12A and 12B).

An Encoder 128 performs the 4B/5B encoding of data symbols from the Data Stream Generator 122 and passes the resultant data stream to a Test Data Mux 130. The four bits of data and one control bit from the Data Stream Generator 126 are encoded into a unique 5-bit symbol. Although the encoder operates on symbol pairs, each symbol is encoded independently of the other.

The Test Data Mux 130 normally selects the data from the Encoder 128 and passes it to a Transmit Data Output 132. The Test Data Mux 130 can also select data from a Built-In-Self-Test 120 (BIST 120).

The Transmit Data Output 132 outputs to the EB Local Loopback Mux 102, the LM Local Loopback Mux 106, and the TDATA output of the ELM circuit. The TDATA output is analogous to the output bus from the ELMs to the cipher circuits in FIG. 1. The Transmit Data Output 132 converts the symbol pairs that it receives using the byte local clock and outputs symbols using the symbol local clock.

The Physical Connection Management circuit 136 controls the insertion and removal of links from the ring. The Bypass Mux 110 is used by the Physical Connection Management circuit 136 to isolate links. The Physical Connection Management (PCM) circuit 136 implements the PCM state machine specified by the SMT standard. The PCM state machine is controlled by software located in the node processor external to the ELM circuit. A Node Processor Interface 138 is used by the external node processor to control the ELM circuit including the Physical Connection Management circuit 136.

The Node Processor Interface 138 provides for both status monitoring and control of the ELM circuit by an external processor. The Node Processor Interface 138 consists of 35 control/status registers.

The built in self test (BIST) 120 tests the ELM circuit by circulating pseudo-random data throughout the ELM circuit. The various subcircuits within the ELM circuit are observed as they respond to the data, and a signature based upon their behavior is generated. This signature may be checked against a correct signature to verify chip functioning. A fault or failure within the ELM circuit, within the coverage of the BIST 120, will cause a different signature to be generated.

The ELM circuit, using the above sub-circuits, supports the ANSI FDDI PHY Standard, 4B/5B encoding and decoding, elasticity buffer, data frame recognizer and aligner, PCM state machine, Line State Detector, Repeat Filter, Scrubber, and BIST functions.

Figure 4:
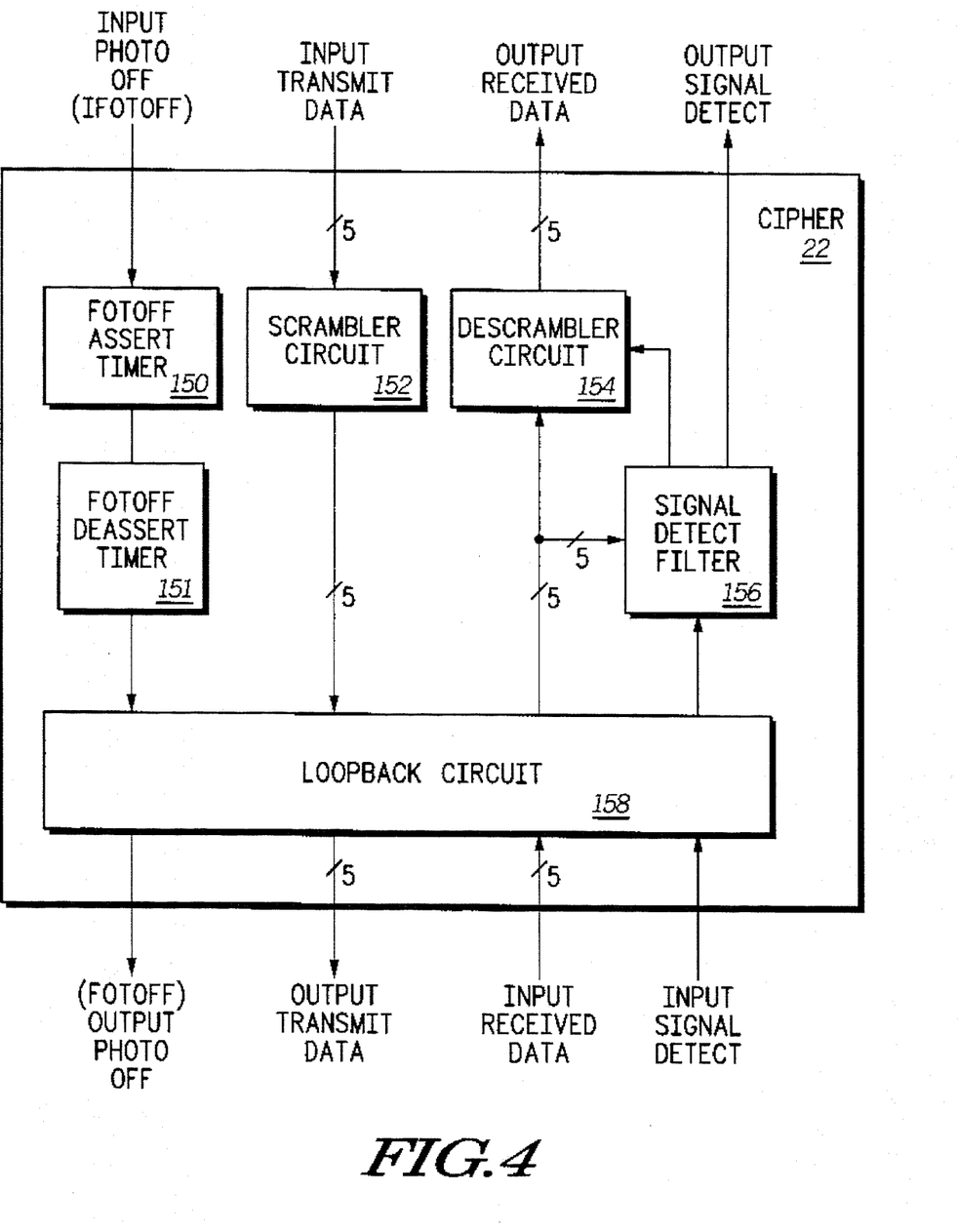
FIG. 4 illustrates, in a block diagram, a cipher circuit (also referred to as a scrambling/descrambling circuit) in accordance with the present invention.

FIG. 4 illustrates a cipher circuit which may be used as one or more of either cipher circuit 22, 24, 26, and 28 of FIG. 1. FIG. 4 illustrates one cipher circuit 22. Cipher circuit 22 has a Scrambler circuit 152 and a corresponding Descrambler circuit 154.

The Scrambler 152 scrambles the input transmit data, which is the TDATA output of the ELM circuit illustrated in FIG. 3. The scrambling operation is performed by adding modulo-2 a key stream produced by the LFSR counter using the polynomial $X^{11}+X^9+1$ to the data. Scrambler 152 operates on 5-bit symbols as output from the ELM circuit.

The Descrambler 154 descrambles the received data, by subtracting module-2 an identical bit stream produced by a identical counter as used in the Scrambler 152. The Descrambler 154 also operates on 5-bit symbols as input from the received data input. In order for the Descrambler 154 to produce the identical key stream as used in the remotely transmitting Scrambler 152 the Descrambler 154 detects special patterns due to repeating symbols (e.g. Idles, Quiets, Halts, and Master) occasionally present in the receive bit stream.

The Signal Detect Filter 156 normally passes the INPUT SIGNAL DETECT through to the OUTPUT SIGNAL DETECT. The Signal Detect Filter 156 monitors the INPUT RECEIVED DATA, and if more than 1 µS elapses without any activity on the input received data bus, then the OUTPUT SIGNAL DETECT is held de-asserted until activity is asserted. The assertion of the OUTPUT SIGNAL DETECT is delayed 1 µS to permit the Descrambler 154 to synchronize its key stream generator and thus produce correct OUTPUT RECEIVED DATA.

The Fotoff Assert Timer 150 delays the assertion of the FOTOFF output from the ELM circuit. This timer is programmable in 40 nS increments up to 2.62 µS. While the assert timer is delaying FOTOFF, a Loopback Circuit 158 forces off the input received data stream as well as the input signal detect. This permits additional time for the receiving end to achieve the target bit-error-rate of $10^{-9}$.

The Fotoff De-assert Timer 151 delays the deassertion of the FOTOFF output from the ELM circuit. This timer is programmable in 40 nS increments up to 2.62 µS. This timer allows scrambled Quiet symbols to be transmit while FOTOFF is being delayed. Following this delay time, "true" or unscrambled quiet symbols are then transmitted allowing easy detection and resetting of the remote receiver. In other words, the Fotoff De-assert Timer 151 allows scrambled quiet signals to be sent for a predetermined amount of time followed by unscrambed quiet symbols when the timer times-out.

The Loopback Circuit 158 normally passes transparently the FOTOFF, output transmit data, input received data, and input signal detect signals. When the loopback function is active the output of the Scrambler Circuit 152 is routed to the input of the Descrambler circuit 154, the SIGNAL DETECT INPUT to the Signal Detect Filter 156 is forced active, the OUTPUT TRANSMIT DATA is forced to quiet symbols, and the FOTOFF is forced active.

Figure 5:
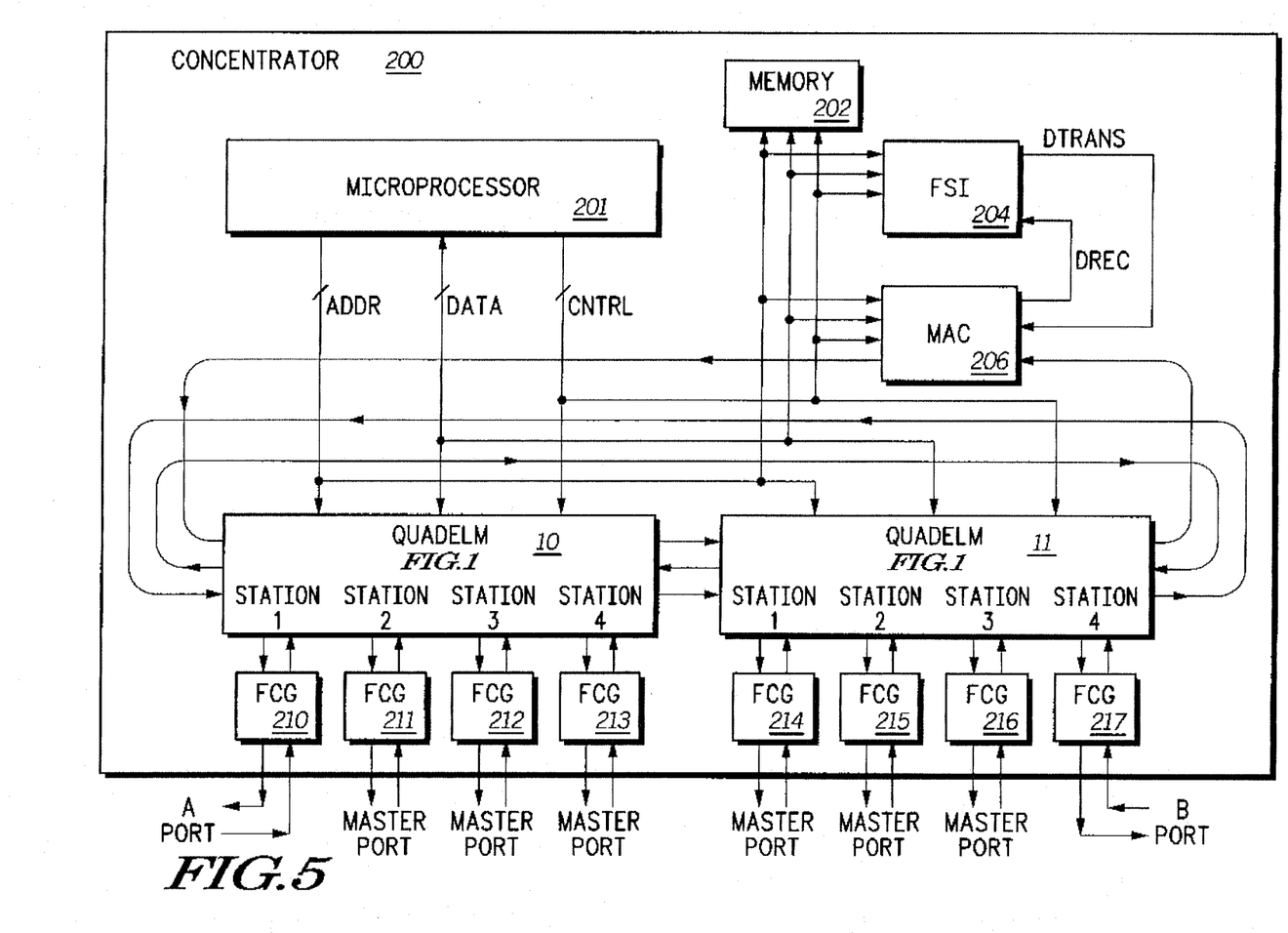
FIG. 5 illustrates, in a block diagram, a concentrator circuit/system having multiple integrated circuits, each in accordance with FIG. 1, the concentrator circuit/system being in accordance with the present invention.

FIG. 5 illustrates a concentrator 200 which is designed to include one or more quad elm devices illustrated in FIG. 1. A microprocessor 201 provides the station management control functions for the concentrator. This includes implementing the SMT standard as defined in the ANSI SMT FDDI standard. It uses an output address bus (ADDR), an output control bus (CNTRL), and a bi-directional data bus (DATA) to communicate with the other circuits in the concentrator system.

A memory 202 contains the SMT software code and the variables that the software code utilizes. The memory 202 is accessed by the microprocessor 201 by the ADDR, CNTRL, and DATA buses.

An FDDI System Interface (FSI) circuit 204 and a media access control (MAC) 206 provide the capability to send and receive data frames during the physical connection insertion process to affect a link confidence test as is optionally prescribed by the SMT standard. This capability to send and receive data frames during the physical connection insertion process is not used in the normal operation of the concentrator 200, but is only used for point to point communication with a station prior to its joining the communication ring. The MAC 206 is coupled to the stations via the R-BUS, which allows coupling to any one of the stations in the concentrator 200 system. The MAC 206 is often referred to as a "Roving MAC". The FSI 204 is coupled to the MAC 206 by an output bus that contains both data and control information (DTRANS) and by an input bus that contains both data and control information (DREC). The FSI 204 and MAC 206 circuits are both coupled to the microprocessor via the ADDR, CNTRL, and DATA buses.

Quad ELM circuits 10 and 11 in FIG. 5 are analogous to the quad ELM circuit of FIG. 1. A concentrator system such as that illustrated in FIG. 5 must contain two or more ELM circuits, such as the eight that are present in FIG. 5 (four ELMS are in each quad ELM device as in FIG. 1). The quad ELM circuits 10 and 11 are coupled to the microprocessor 201 via the ADDR, CNTRL, and DATA buses. The quad ELM circuits 10 and 11 are coupled to the MAC circuit via the R_BUS, and are coupled to each other via the P_BUS and the S_BUS. Quad ELM circuit 10 is coupled to four FDDI Clock Generator (FCG) circuits 210, 211, 212, and 213 via and input data and control bus and an output data and clock bus. Quad ELM circuit 11 is coupled to four FCG circuits 214, 215, 216, and 217 via and input data and clock bus and an output data and control bus.

The FCG circuits 210, 211, 212, 213, 214, 215, 216, and 217 serve two purposes. Both the symbol and byte local clocks needed by the ELM circuits in the quad elm circuits 10 and 11 are generated by the FCG circuits 210, 211, 212, 213, 214, 215, 216, and 217. The five bit wide symbol data from the ELM circuits in the quad elm circuits 10 and 11 are serialized and NRZI encoded, in a known manner, for output external to the concentrator circuit 200 by the FCG circuits 210, 211, 212, 213, 214, 215, 216, and 217. Serial NRZI encoded data is received by the FCG circuits 210, 211, 212, 213, 214, 215, 216, and 217 from external to the concentrator circuit 200. The FCG circuits 210, 211, 212, 213, 214, 215, 216, and 217 recover a clock and extract data from this input bit stream.

The concentrator circuit 200 is coupled to media dependent drivers and receivers through the input/output ports illustrated in FIG. 5. An A PORT and a B PORT provide coupling to the backbone ring in an FDDI system. A MASTER PORT provides coupling to another FDDI concentrator circuit or an FDDI end-station (see FIG. 6 for an illustration of how concentrators, a communication ring, and end-stations combine to form a local area network).

Figure 6:
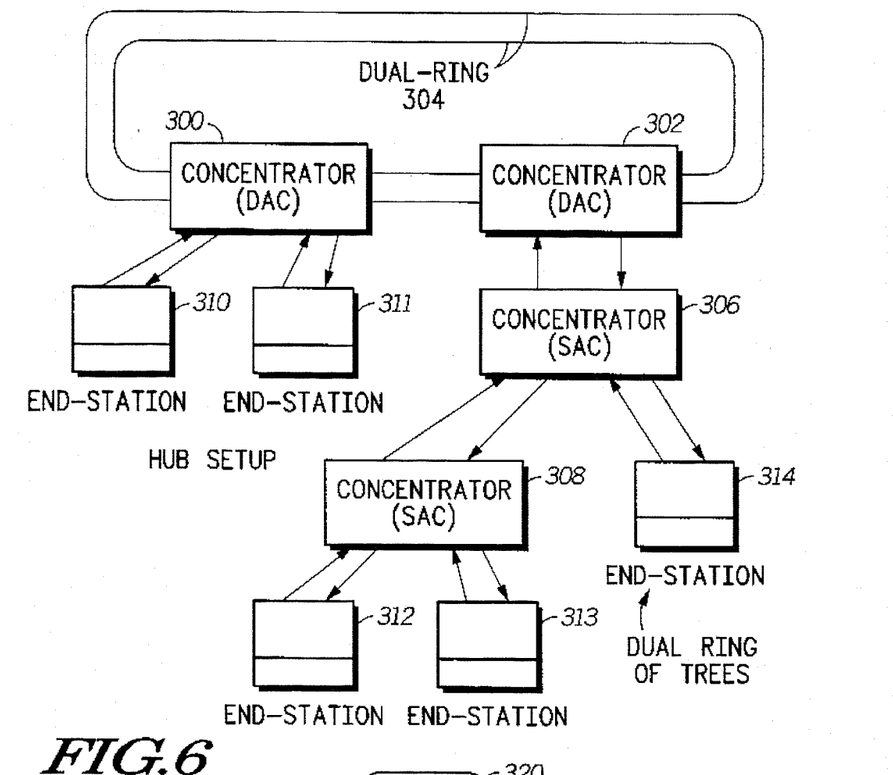
FIG. 6 illustrates, in a block diagram, a local area network (LAN) in accordance with the present invention.

FIG. 6 illustrates a local area network (LAN) system or a fiber distributed data interface (FDDI) system which uses concentrators 300, 302, 306, and 308 which are each analogous to the concentrator of FIG. 5. Concentrators 300 and 302 are dual attach concentrators (DAC) that are coupled to a dual counter-rotating FDDI backbone communication ring 304. Concentrators 306 and 308 are single attach concentrators (SAC) that are coupled to a MASTER PORT in a concentrator that is above them in the system hierarchy. For example, concentrator 302 is above concentrator 306 in the system hierarchy. End-stations 310, 311, 312, 313 and 314, which represent FDDI end-stations in FIG. 6, are also connected to a MASTER PORT of a concentrator that is above them in the system hierarchy. End-stations may be computers, workstations, communication devices, or other FDDI/LAN compatible devices.

A concentrator provides a connection point for end-stations or other FDDI concentrators. It also can perform the functions of station bypass, station insertion, and network management. If a concentrator detects a high error rate or defective connection, it will logically disconnect the faulty end-station or concentrator from the ring. A concentrator can insert any end-station or concentrator in response to a correction of faults or an end-station or concentrator coming on line. Network management software allows the network manager to configure a concentrator to the needs of the network. This capability can be used for fault isolation.

The dual ring 304 provides a primary and secondary path for data transmission. In normal operation only the primary path is used. In the presence of any single fault on the network, the network management can bypass the failure by logically routing data onto the secondary path and isolating the failed section. This creates a single continuous ring.

The purpose of the network illustrated in FIG. 6 is to allow the exchange of information between end-stations. End-stations 310, 311, 312, 313, and 314 are terminals, workstations, hosts, or servers in a preferred form.

Figure 7:
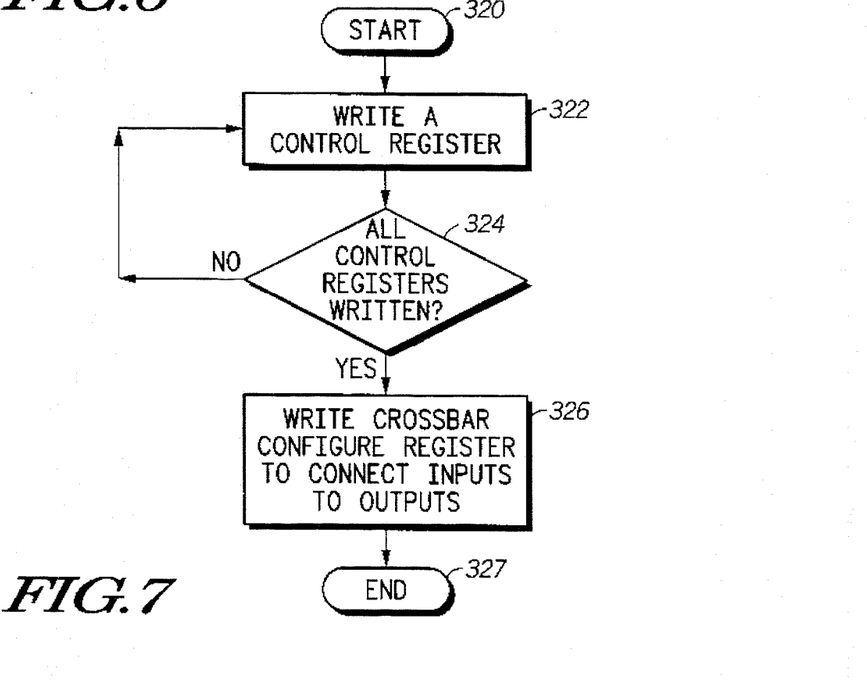
FIG. 7 illustrates, in a flowchart, a method for switching an integrated circuit having two or more elastic layer and buffer management (ELM) circuits and a crossbar switching circuit, the method being in accordance with the present invention.

FIG. 7 illustrates a switching method which is used to control the switching circuit of FIG. 2. A step 320 is the start of the switching method. A step 322 writes a value to one of the control registers 50, 51, 52, 53, 54, 55, or 56 shown in FIG. 2. This write is accomplished by interacting with the register control block 40 as was described above for FIG. 2. A step 324 determines if all of the control registers 50, 51, 52, 53, 54, 55, and 56 have the proper values for the desired crossbar configuration. If not, step 322 is repeated and other address value(s) are entered into control register(s). If all the proper values are in the first stage of registers, a step 326 writes the location in the register control 40 that causes the WRITE_XBAR signal in FIG. 2 to be asserted. The assertion of the WRITE_XBAR signal causes the values in control registers 50, 51, 52, 53, 54, 55, and 56 to be transferred to the second stage of control registers 60, 61, 62, 63, 64, 65, and 66, and the switches 30, 31, 32, 33, 34, 35, and 36 in FIG. 2 couple their outputs to their inputs according to the values in these registers. Therefore, switching of all inputs to all outputs is performed parallel in time or in a simultaneous manner. After step 326 is completed, the switching circuit configuration is complete, and a step 327 ends the switching method.

The present invention provides a method for switching a quad ELM device, discusses a compact quad ELM device/integrated circuit, and various applications for using the quad ELM device in local area network applications and concentrators. With such a method and quad ELM integrated circuit, the user can realize many advantages over previous technology.

Board space requirements of current concentrators limit the number of end-station connections feasible in a concentrator implementation. Board area and chip count are reduced by utilizing a quad ELM device in the concentrator design. Combining four ELM devices on a single integrated circuit and including the switching matrix, the control circuitry for the matrix, the interconnect between the ELMs, and the cipher devices solves the board area limitation problem. Reduced chip count and board area translates to reduced cost.

Integrating the cipher circuits onto the quad elm allows software control of the functions the cipher circuits provide. This is achieved by making use of the software interface that is internal to each of the ELM circuits. Utilizing this software interface that is already inherent in the device eliminates the need for a separate interface for the cipher circuits, further reducing cost and area requirements.

Current concentrator designs utilizing discrete multiplexing structures are unable to cost-effectively achieve the level of flexibility necessary to implement all of the configuration states required in a concentrator by SMT. By allowing all outputs to be coupled to any input, the crossbar switch provides a level of interconnection flexibility sufficient for this need.

The use of the crossbar switching matrix is greatly simplified by the register control scheme implemented in the quad ELM. Each output within the crossbar is controlled by a three bit field within the control registers. These three bit fields (addresses) are designed the same for all outputs. With these 3-bit fields, any input can be coupled to any output at any time. This greatly simplifies the software necessary to configure the crossbar switch and provides SMT compatibility in a flexible manner.

In current concentrator implementations, the switching matrix, which adds or deletes ELMs from the backbone rings, causes an interruption in service to end-stations on the network as the system goes into a reset state. This occurs every time that an ELM's configuration in the network is changed. In the quad elm, the WRITE_XBAR signal allows the entire configuration matrix to switch at one time, which reconfigures all four ELMs simultaneously and reduces the impact of the interruption-of-service problem.

As the standards for FDDI over different types of media continue to evolve, one of the issues that is under discussion is whether true quiet signals or scrambled quiet signals should be transmitted during the break connection of SMT. The fine resolution timers affecting the FOTOFF signal assertion and deassertion permit control of the transition from scrambled to true quiet by an external FCG circuit, giving the quad ELM of FIG. 1 wider applications.

While the present invention has been shown and described with reference to specific embodiments, further modifications and improvements will occur to those skilled in the art. For example, the number of ELM devices on the circuit could be changed to include any number of ELMs greater than one. Other circuits that are similar to the function or purpose of the ELM circuit could be substituted for the ELMs in the quad ELM design.

There are some sections in the quad ELM design that are redundant because of the integration. These sections could be combined in the circuit to reduce gate count on the chip. Integration on a higher level is also possible. Additional circuits such as the MAC, FSI and FCG circuits discussed above could be brought into the quad ELM circuit to further reduce size and cost.

Another possible change could be in the number and size of the input and output buses of the quad elm circuit (more than three buses or less than three buses may be used and the bit width of these buses may also change).

The crossbar implementation used could be altered in many ways. A similar block that provides a subset of the functionality of a full crossbar could be substituted or similar switching strategies could be used.

Although the system shown here is for use in a FDDI environment, the architecture and techniques shown could be ported to other protocols or network technologies (e.g., any token-passing local area network).

The crossbar switch taught herein may have N inputs and N outputs wherein N is a positive finite integer greater than one.

It is to be understood, therefore, that this invention is not limited to the particular forms shown and that it is intended in the appended claims to cover all modifications that do not depart from the spirit and scope of this invention.

What is claimed is:

1. A method for controlling interconnection of a plurality of input conductors to a plurality of output conductors in a local area network, the method comprising:

writing an address value to each control register in a plurality of control registers wherein each control register in the plurality of control registers corresponds to at least one output conductor, each address value written to each control register identifying an input conductor;

switching a switching circuit to connect any one of the input conductors in the plurality of input conductors to any one of the output conductors in the plurality of output conductors based upon the address values stored in the plurality of control registers; and transferring FDDI data cells through the plurality of input conductors and the plurality of output conductors to communicate information in the local area network after the steps of switching and writing.

2. The method of claim 1 wherein the step of switching comprises:

switching N inputs of a crossbar switch to connect to N outputs of a crossbar switch.

3. The method of claim 1 wherein the step of switching comprises:

switching N inputs of a crossbar switch simultaneously in time to connect to N outputs of a crossbar switch in response to a control signal and the address values.

4. The method of claim 1 wherein the step of switching comprises:

switching the switching circuit to be compatible with a fiber distributed data interface (FDDI) protocol which supports stream cipher scrambling.

5. A method for initializing a cross-bar switching circuit in a fiber distributed data interface (FDDI) integrated circuit, the cross-bar switching circuit having a first plurality of inputs, a second plurality of inputs, a first plurality of outputs, and a second plurality of outputs, the first plurality of inputs being coupled to a first plurality of external terminals of the integrated circuit for receiving input signals from external to the integrated circuit, the first plurality of output signals coupled to a second plurality of external terminals of the integrated circuit for providing output signals external to the integrated circuit, each input in the second plurality of inputs being coupled to a corresponding one elastic layer management (ELM) device of a plurality of ELM devices located internal to the integrated circuit, each output in the second plurality of outputs being coupled to a corresponding one ELM device of the plurality ELM devices located internal to the integrated circuit, the method comprising the steps of:

writing a plurality of values to a first plurality of storage registers, each value in the plurality of values corresponding to a unique one input in the first plurality and second plurality of inputs, and each storage register in the first plurality of storage registers being associated with a unique one output in the first plurality and second plurality of outputs; and enabling a first control signal such that the plurality of values are simultaneously applied to the cross-bar switching circuit so that the first plurality and second plurality of inputs are coupled through the cross-bar switching circuit to the first plurality and second plurality of outputs in accordance with the plurality of values.

6. The method of claim 5 wherein the step of enabling comprises:

coupling any of the inputs in the first plurality and second plurality of inputs to any of the outputs in the first plurality and second plurality of outputs.

7. The method of claim 5 wherein the step of enabling comprises:

transferring the plurality of values from the first plurality of storage registers to a second plurality of storage registers; and applying the plurality of values from the second plurality of storage registers to the cross-bar switching circuit such that the first plurality and the second plurality of inputs are coupled through the cross-bar switching circuit to the first plurality and second plurality of outputs in accordance with the plurality of values.

8. The method of claim 5 wherein the step of enabling comprises:

enabling the first control signal by writing to a predetermined register in the integrated circuit.

9. The method of claim 5 further comprising:

providing a second control signal which overrides a configuration of the cross-bar switching circuit determined by the plurality of values and places one of the ELM devices of the plurality of ELM devices into a test mode.

10. The method of claim 9 further comprises:

providing the second control signal from external to the integrated circuit.

11. The method of claim 5 wherein each input in the first plurality and second plurality of inputs is a bus that comprises a plurality of conductors.

12. The method of claim 11 wherein each bus conducts data signals and a corresponding parity signal for the data signals.

13. The method of claim 5 further comprising the steps of:

placing one ELM device of the plurality of ELM devices into a test mode wherein data input signals of the one ELM device are coupled to a first input of the first plurality of inputs and data output signals of the one ELM device are coupled to a first output of the first plurality of outputs.

14. The method of claim 13 further comprising the steps of:

coupling test input signals of the one ELM device to a second input of the first plurality of inputs and coupling test output signals of the one ELM device to a second output of the first plurality of outputs to communicate test data.

15. The method of claim 14, wherein the test input signals and the test output signals are not provided external to the integrated circuit in a non-test mode of operation.

16. A method for routing data in a fiber distributed data interface (FDDI) integrated circuit (IC) that includes multiple elastic layer management (ELM) devices, the method comprising the steps of:

writing a first plurality of values to a first plurality of storage registers, each storage register in the first plurality of storage registers corresponding to a single output bus of a first plurality of output buses coupled to external terminals of the integrated circuit;

writing a second plurality of values to a second plurality of storage registers, each storage register in the second plurality of storage registers corresponding to an input bus of a plurality of input buses wherein each input bus of the plurality of input buses is coupled to one of the multiple ELM devices internal to the integrated circuit;

writing the first plurality of values and second plurality of values from the first plurality of storage registers and second plurality of storage registers to a third plurality of storage registers to simultaneously apply the first and second plurality of values to a switching circuit; and wherein the switching circuit contains a plurality of inputs coupled to input buses from external to the integrated circuit and output buses from the multiple ELM devices and a plurality of outputs coupled to the first plurality of output buses and the plurality of input buses coupled to the multiple ELM devices, the first and second plurality of values allowing any of the plurality of inputs of the switching circuit to be coupled to any of the plurality of outputs of the switching circuit.

17. The method of claim 16 wherein the step of writing the first plurality of values and second plurality of values from the first plurality of storage registers and second plurality of storage registers to a third plurality of storage registers occurs in response to writing to a predetermined register in the integrated circuit.

18. The method of claim 16 further comprising:

providing a control signal which overrides a configuration of the switching circuit determined by the first plurality of values and second plurality of values and places one of the multiple ELM devices into a test mode.

19. The method of claim 16, wherein the method of routing data in a fiber distributed data interface (FDDI) integrated circuit (IC) further comprises routing data in an FDDI concentrator system that includes the FDDI IC.

20. The method of claim 16 further comprises routing data in a fiber distributed data interface (FDDI) integrated circuit (IC) that includes multiple elastic layer management (ELM) devices and multiple circuits that support stream cipher scrambling.

* * * * *